Patented Jan. 15, 1952

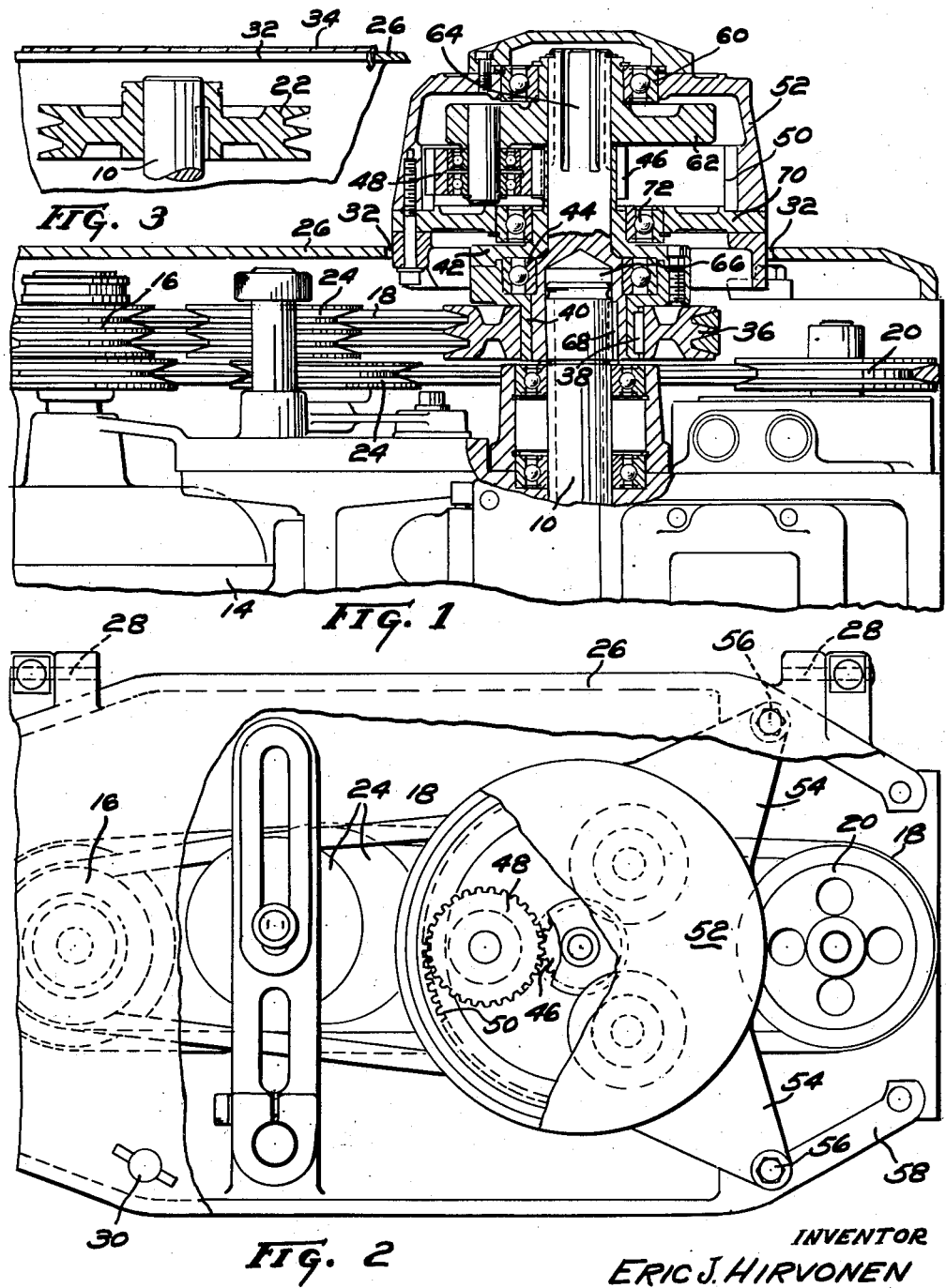

2,582,698

UNITED STATES PATENT OFFICE 2,582,698

SPINDLE DRIVE FOR MACHINE TOOLS

Eric J. Hirvonen, Shrewsbury, Mass., assignor to Leland-Gifford Company, Worcester, Mass., a corporation of Massachusetts Application September 18, 1950, Serial No. 185,445

6 Claims. (Cl. 74—801)

This invention relates to an easily convertible spindle drive for machine tools in general but relating to any drive construction where convenient.

The principal object of the invention relates to a housing having a hinged lid or cover including an opening, said opening normally being closed and directly located over the main spindle of the machine so that when the cover is removed, the spindle and its drive is exposed; said cover being replaceable by a gear reduction box of a particular and novel construction whereby the lid may be removed, the main spindle pulley removed from the spindle, and the entire novel gear reduction directly applied thereto so as to provide for a different range of speeds for driving the spindle with a minimum of time and effort necessary to achieve the change over.

Other objects and advantages of the invention will appear hereinafter.

Reference is to be had to the accompanying drawings in which

Fig. 1 is a vertical section through the device and illustrating the gear reduction arrangement and position thereof;

Fig. 2 is a top plan view thereof; and

Fig. 3 is a detailed view showing the main driving spindle of the machine with the gear reduction device removed and the spindle being driven directly.

In the present instance, the main drive shaft of the machine under consideration, or the spindle of a machine tool of any description, is indicated at 10, and the principal object of the present invention resides in the construction of gearing to drive the spindle at two completely different ranges of speed with a minimum of effort and time required for the change over.

The spindle may be journaled in bearings 12 or the like including circular keys, washers, or similar constructions for holding the spindle in its axial position.

The prime mover is indicated at 14 and this is provided with pulleys 16 driving belt 18 in turn driving a pulley 20, the latter driving a hydraulic pump for ordinary machine tool use, whether for operating parts of the machine, or for any other reason. Ordinarily the belts 18 will drive a pulley 22, see Fig. 3, directly splined to the spindle 10 and this, of course, affords a high speed rotation. The belts may be tightened as by idlers 24, the same being adjustable in the conventional manner.

A housing is provided enclosing the entire mechanism and this housing may assume any shape desired, but pertinent to the present invention there is a cover 26 which is hinged on pins 28 to be swung up to expose the entire mechanism or swung down completely enclosing the same and locked by dogs 30 or the like. The cover 26 has a hole 32 just over the spindle end and pulley. The hole is normally closed by cover 34. This cover is removable and replaceable by the gear reduction to be described below.

The pulley 22 is removed from the spindle and replaced by a pulley of like diameter 36 but which has a larger hub keyed as at 38 to a sleeve 40 extending upwardly and bolted to or integral with another sleeve 42. The sleeve 40 extends outwardly as shown and contains a bearing 44 for a purpose to be described. The sleeves 40 and 42 are rotated by pulley 36 and the latter is provided with a gear of the pinion type at 46 in mesh with a planetary 48, the latter being in mesh with the fixed circular gear rack 50 located on the interior of a fixed housing 52, the latter having legs 54 which may be bolted as at 56 to the rim 58 of the housing. The housing 52 is provided with bearings 60 for the wheel 62 which is rotated by reason of the planetary 48 and this wheel is splined to a stub shaft or the like 64 which extends downwardly within the sleeve 42 and is hollowed out at its lower end as at 66 to accommodate the top of the spindle 10 to which it is splined at 68.

A housing 52 is provided with a flange 70 and bearings 72 for the sleeve 42 so that it will be seen that every rotary part is adequately journaled; and also it is believed that the operation of the train of gears included in the gear reduction box will be clear to those skilled in the art inasmuch as the pulley 36 is directly keyed to sleeves 40 and 42, the latter being geared to the planetary in turn geared to the housing so that the stub shaft 64 is rotated and thereby rotates the spindle 10.

In order to convert the machine from one drive to another it is merely necessary to remove cover 34, remove the pulley 32 and slip the pulley 36 down over the top of the spindle 10 with the stub shaft 64 engaging in the key ways at 68. When the housing 52 is bolted down, the device is ready to operate at a different range of speeds.

Having thus described my invention and the advantages thereof, I do not wish to be limited to the details herein disclosed otherwise than as set forth in the claims, but what I claim is:

1. A convertible speed reduction device for a shaft comprising a housing, means to drive the shaft in the housing including a pulley, an opening in the housing alined with the pulley, a separable and replaceable unit including a housing for fixed securement to the first housing and in the opening, a sleeve rotated by the pulley, a hollow pinion gear on the sleeve, a planetary gear in mesh therewith, a fixed ring gear in mesh with the planetary, a member rotated by the planetary gear, and an axially removable spline construction between the shaft and the member.

2. A convertible speed reduction device for a shaft comprising a housing, means to drive the shaft in the housing including a pulley, an opening in the housing larger than the pulley, a separable and replaceable unit including a housing for fixed securement to the first housing in the opening, a sleeve rotated by the pulley, a hollow pinion gear on the sleeve, a planetary gear in mesh therewith, a fixed ring gear in mesh with the planetary, a member rotated by the planetary gear, and an axially removable spline construction between the shaft and the member, said pulley having a cylindrical opening therethrough accommodating the sleeve, the shaft being in the sleeve.

3. The device of claim 2 wherein the member is provided with a cylindrical axially located hole and the shaft end fits therewithin, the spline being in the hole.

4. A speed reduction device for a shaft comprising a housing, means to drive the shaft within the housing, a pulley, the pulley having a center hole larger than the shaft, a sleeve between the shaft and pulley and connected to the pulley for rotation thereby, said sleeve extending along and beyond the shaft away from the pulley, a gear on the sleeve, a planetary gear therefor, a fixed ring gear for the planetary gear, a member rotated by the latter on the axis of the shaft, and an axially removable spline connection between the shaft and the member, said member having an axial opening receiving the end of the shaft, and forming a sleeve within the first named sleeve, the two sleeves being concentric but unconnected except through the planetary gear.

5. The combination of a shaft, a pulley thereon, and means to drive the pulley, with a gear reduction device selectively replacing the pulley, said device comprising a second pulley having a larger center hole than the first pulley, a sleeve in the hole and surrounding the shaft, said sleeve being connected to the second pulley, a gear on the sleeve, a planetary gear construction, a member rotated thereby, and an axially movable spline between the member and the shaft end portion.

6. The combination of claim 5 including a housing for the shaft, first pulley, and the driving means, and a separate housing for the gear reduction device, the first housing having a hole and a cover therefor and the second housing fitting in said hole with the cover removed.

ERIC J. HIRVONEN.

REFERENCES CITED

The following references are of record in the file of this patent:

UNITED STATES PATENTS

| Number | Name | Date |
| --- | --- | --- |
| 1,785,839 | Meister et al. | Dec. 23, 1930 |
| 2,147,285 | Double et al. | Feb. 14, 1939 |